June 4, 1935.  J. P. WATSON  2,004,067
ANTIAIRCRAFT GUNFIRE CONTROL APPARATUS
Filed Feb. 14, 1934   3 Sheets-Sheet 1
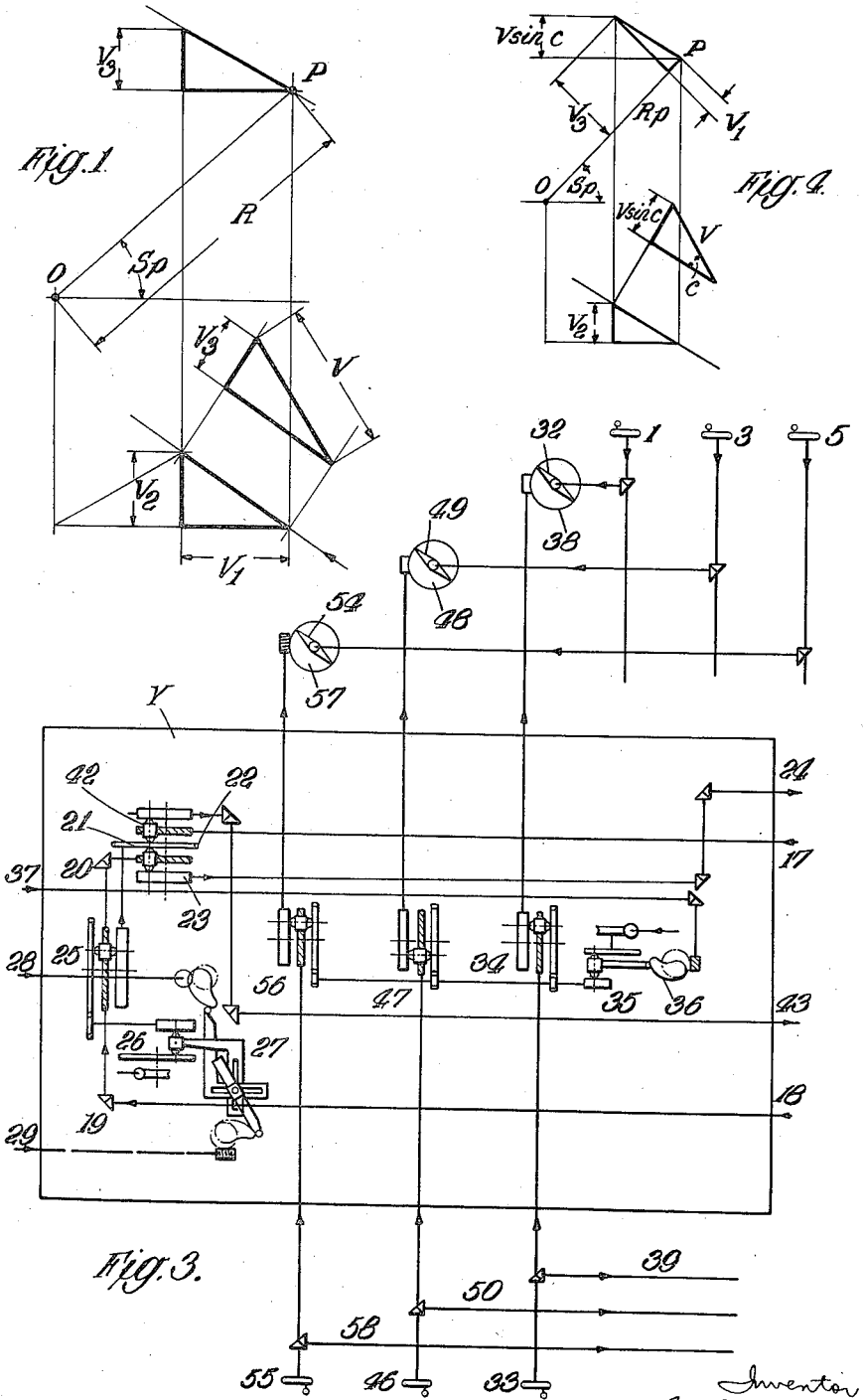

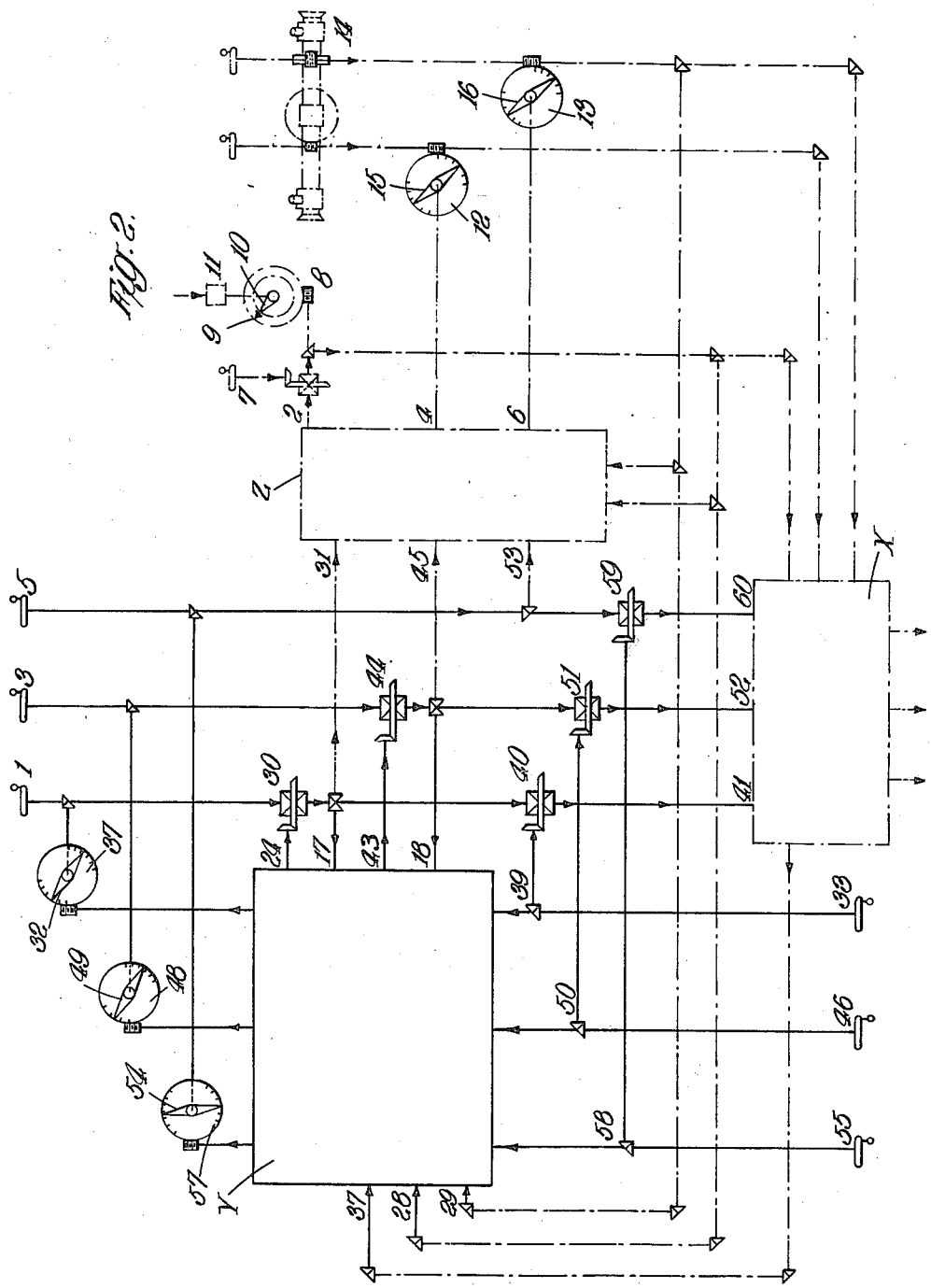

June 4, 1935.  J. P. WATSON  2,004,067
ANTIAIRCRAFT GUNFIRE CONTROL APPARATUS
Filed Feb. 14, 1934  3 Sheets-Sheet 3
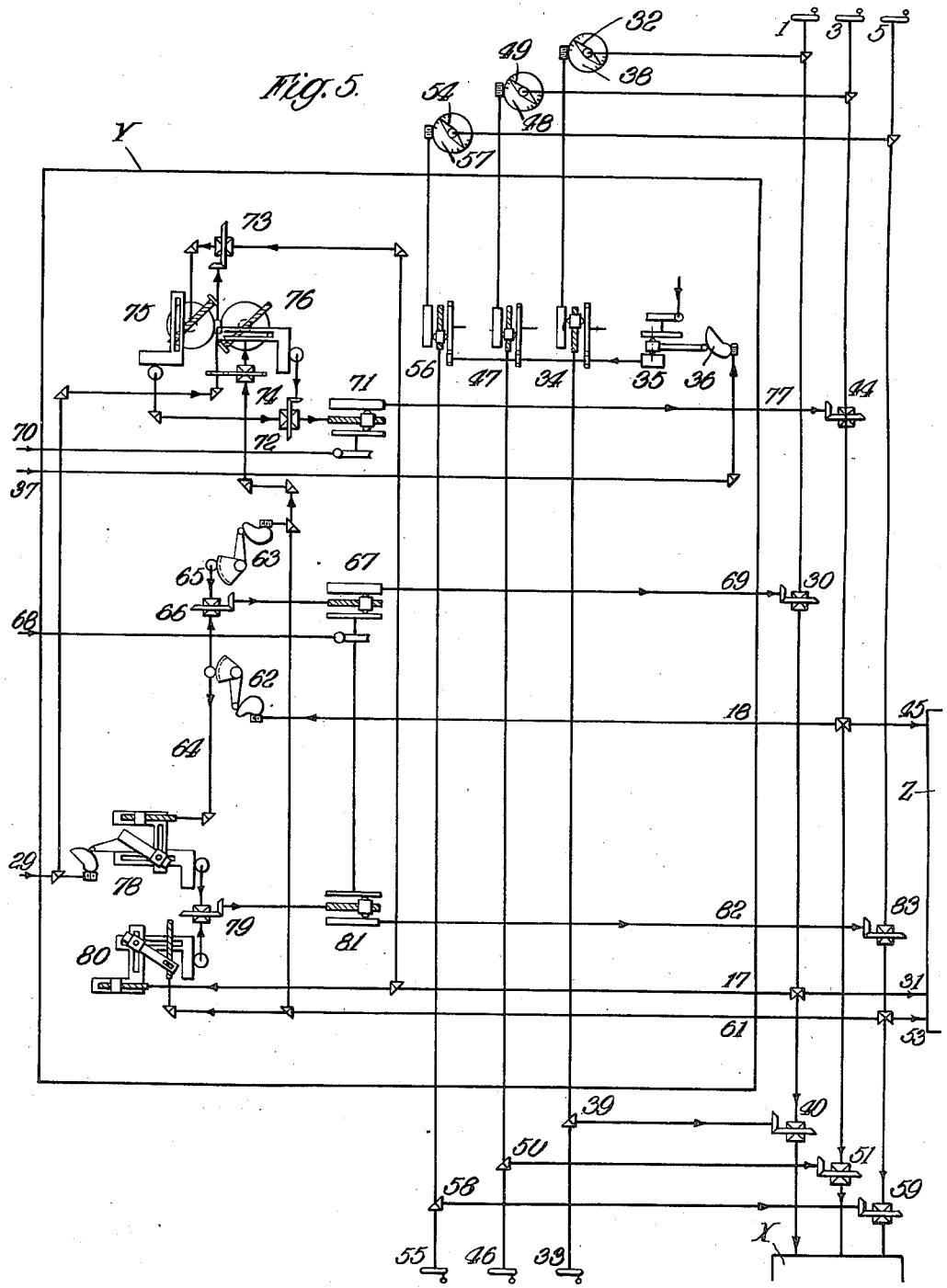

Patented June 4, 1935

2,004,067

UNITED STATES PATENT OFFICE 2,004,067

ANTIAIRCRAFT GUNFIRE CONTROL APPARATUS

John Percival Watson, Westminster, London, England, assignor to Vickers-Armstrongs Limited, London, England, a British company Application February 14, 1934, Serial No. 711,172
In Great Britain January 3, 1933

8 Claims. (Cl. 89—41)

This invention relates to anti-aircraft gun fire control apparatus having means for predicting a future position of the target on the assumption that the target moves along a known or assumed course and means for applying correction when the target moves along a different course. According to the invention the apparatus comprises means movable as for an assumed course in accordance with (1) the linear rate of approach or recession of the target in the direction of the line of sight, this vector being termed $V_1$, (2) the linear rate of movement of the target at right angles to the aforesaid direction, this vector being termed $V_2$ and (3) a linear height rate, this vector being termed $V_3$, means for comparing these movements with observed data, and means for deriving from the comparison effected by the second mentioned means correctional movements required to be combined with the actual vectors for use in predicting future positions of the target. The means for producing said correctional movements preferably comprise means for deriving the difference in the rate of change of each actual vector and the rate of change of the corresponding assumed course vector and means for modifying the difference in the rates of change according to the time of flight of the projectile.

In the accompanying drawings Figures 1 and 4 are diagrams serving to illustrate the principle of the apparatus.

Figures 2, 3 and 5 are diagrammatic representations of forms of apparatus embodying the invention.

The known or assumed course may be a straight line course and the correction will then be applied when the target moves along a curved course.

The vector $V_3$ is a vector in any convenient direction which will give a rate proportional to height and in Figure 1 of the accompanying drawings it will be seen that this vector is the component of speed of the target at right angles to the surface of the earth, but in the example illustrated in Figure 4 is the component of speed which lies in a vertical plane through the sight and the target and is at right angles to the line of sight.

The relation of these vectors to the target vector $V$ is shown in Figure 1 of the accompanying drawings, which is a vector diagram wherein the quantities $V_1$, $V_2$ respectively represent plan views of the linear rate vectors along and at right angles to the line of sight. Observations are made from a point O of a target at P, the present range being $Rp$ and the present angle of sight $Sp$.

By way of illustrating the invention a form of apparatus, capable of dealing with "plan view" vectors $V_1$, $V_2$ and a vertical height rate vector $V_3$ will now be described; this is illustrated diagrammatically in Figure 2, Figure 3 representing mechanisms for determining rates of change of vectors in respect of a straight-course target and vectors predictions for a curved-course target.

The apparatus comprises, in addition to the predictor proper X, see Figure 2, and the aforesaid mechanisms contained in a casing Y, a casing Z containing devices for generating range, training and elevation. The mechanisms in the box Z are merely variable speed gears and slider mechanisms for converting the movements of the shafts 31, 45 and 53 (hereinafter described), into the movements required for the shafts 2, 4 and 6 (hereinafter described), respectively. The shafts 31, 45 and 53 move in accordance with $V_1$, $V_2$ and $V_3$, respectively. The shafts 2, 4 and 6 move in accordance with $V_1 \cos Sp - V_3 \sin Sp$;

$$\frac{V_2}{Rp \cos Sp}$$

and $$\frac{V_1 \sin Sp - V_3 \cos Sp}{Rp}$$

respectively. Of these devices one is adjusted by a handle 1 in accordance with the initial $V_1$ and operates a shaft 2 in accordance with generated range, another is adjusted by a handle 3 in accordance with the initial $V_2$ and operates a shaft 4 in accordance with generated training and the third is adjusted by a handle 5 in accordance with the initial $V_3$ and operates a shaft 6 in accordance with generated elevation, the generation of elevation being effected in conjunction with the present range and angle of sight. The generated range shaft 2, in which there may be interposed any suitable form of range tuning device 7, operates, through a worm gearing 8, a pointer 9 moving over a range dial having a second pointer 10 which is rotated according to the range received from an external source 11 and the handle 1 is adjusted in order to keep the pointer 9 moving at the same rate as the pointer 10. Similar arrangements are associated with the generated training and elevation shafts 4 and 6, the primary elements, such as dials 12 and 13, being driven from the training and elevating gears of an observing sight 14, whilst the secondary or following elements, such as pointers 15 and 16, are driven by the said generating shafts. The values of the principal vectors $V_1$, $V_2$ and $V_3$ thus determined are, in a manner described below, also passed into the predictor X where, in conjunction with present range, training and elevation, the corresponding values of the time of flight, fuze, gun training and quadrant elevation are determined, the latter three being for transmission to the guns. The values of time of flight, fuze, gun training and quadrant elevation, as thus determined, produce the same point in space whether the target moves along a curve or on a straight course, and this point (in the case of the straight-course target) is the position of the target at the termination of the time of flight, and in the case of the curved course target is on the tangent to the curved-course of the target at the moment of observation.

While the values of $V_1$, $V_2$ and $V_3$ are identical whether the target is on a straight course or on a curved course, the rates of change or accelerations of $V_1$, $V_2$ and $V_3$ are different when the target is on a straight course from those existing when it is on a curved course. Thus, if the speeds of the handles 1, 3 and 5 are measured, values of the accelerations of $V_1$, $V_2$ and $V_3$ are respectively determined, and if the target is on a curved course, these are the accelerations of $V_1$, $V_2$ and $V_3$ for the curved course. The values of the accelerations of $V_1$, $V_2$ and $V_3$ for a target moving along a course tangential to a curved course at the moment of observation are proportional respectively to:—

$$\frac{dV_1}{dt} = \frac{V_2{}^2}{Rp \cos Sp}; \quad \frac{dV_2}{dt} = \frac{V_1 V_2}{Rp \cos Sp}; \quad \frac{dV_3}{dt} = 0$$

It will be seen that $$\frac{dV_1}{dt}$$

and $$\frac{dV_2}{dt}$$

are functions of the observed instantaneous vectors $V_1$ and $V_2$ and, furthermore, if these accelerations are determined and integrated in variable speed mechanisms and introduced differentially into the settings of $V_1$ and $V_2$, the corresponding handles will not require to be moved for a straight-course target, while if the target is on a curved course the speed of rotation of each handle is a measure of the difference of accelerations of $V_1$ and $V_2$ respectively for the curved course and a straight-line course tangential to the curved course at the point of observation.

If the differences of acceleration of $V_1$, $V_2$ and $V_3$ are determined, and each multiplied by a "mean time of flight $$\frac{t"}{2}$$

mean corrections to $V_1$, $V_2$ and $V_3$ during the time of flight are obtained which, when differentially added to $V_1$, $V_2$ and $V_3$ and passed into the predictor X, produce a future point in space in terms of fuze, gun training and elevation, which lies approximately on the curved course of the target at the point the target will reach at the end of the time of flight.

The mechanisms required for this purpose are arranged in the casing Y and comprise two adjusting shafts 17 and 18, Figures 2 and 3, operated respectively by the $V_1$ and $V_2$ handles 1 and 3, the movements of these shafts in conjunction with the range and the present angle of sight determining the values of $$\frac{dV_1}{dt}$$

and $$\frac{dV_2}{dt}$$

For this purpose the shaft 18, acting through bevel gears 19 and 20, serves to adjust the ball carrier 21 of the duplex variable speed drive so that the distance of the ball carrier from the centre of the disc 22 is proportional to $V_2$, the ball driving a roller 23 mechanically connected to a shaft 24 leading from the casing Y. The disc 22 receives its motion from a second variable speed drive 25 the ball carrier of which is also adjusted from the shaft 18 in accordance with $V_2$, whilst the disc of this drive is driven from the roller of a third variable speed drive 26 the disc of which is rotated by a constant speed motor. The ball carrier of the variable speed drive 26 is adjusted by the result member of a multiplying mechanism 27, which may be of any well-known type, whereof the other two members receive motions proportional to $$\frac{1}{Rp}$$

and $$\frac{1}{\cos Sp}$$

from cams rotated in accordance with the quantities $Rp$ and $Sp$ respectively. These cams are driven from shafts 28 and 29 rotated respectively from the generated range shaft 2 and the elevating gear of the observing sight 14. The said result member therefore moves proportionately to $$\frac{1}{Rp \cos Sp}$$

and the roller 23 of the first-mentioned variable speed drive and the shaft 24 accordingly receive a motion proportional to $$\frac{V_2{}^2}{Rp \cos Sp} = \frac{dV_1}{dt}$$

which is the acceleration of $V_1$. The shaft 24 operates one element of a differential gear 30 another element of which receives its motion from the handle 1, whilst, through a shaft 31, the third element operates the range generating device Z. Thus for a straight-course target the motion received from the shaft 24 is such as to render rotation of the handle 1 unnecessary, but for a curved-course target additional motion must be supplied from the handle 1 to keep the pointers 9 and 10 rotating together at the same speed. The handle 1 also operates a pointer 32 the speed of rotation of which is thus a measure of the difference in the accelerations of $V_1$ previously referred to. A handle 33 mounted in the casing Y is provided for adjusting the ball carrier of a fourth variable speed drive 34, the driving element of which is driven from a fifth variable speed drive 35. The disc of the variable speed drive 35 is operated by a constant speed motor and the ball carrier is adjusted in accordance with the quantity $$\frac{2}{t}$$

by a cam 36 rotated in accordance with the time of flight $t$. The cam 36 is driven from a shaft 37 rotated by the predictor X to represent $t$. The roller of the variable speed drive 34 rotates a dial 38 over which the pointer 32 moves, and thus if the ball carrier of this drive is adjusted so that the dial rotates at the same speed as the pointer the handle 33 for adjusting the ball carrier of the drive 34 must be rotated proportionally to the difference in accelerations for $V_1$ multiplied by $$\frac{t}{2}$$

which constitutes a secondary vector giving the required correction to the vector $V_1$. By means of a shaft 39, the motion of the handle 33 is passed into a differential gear 40 one element of which is driven from the third element of the differential gear 30. The result element of the differential gear 40 drives a shaft 41 which represents a composite vector and passes into the predictor X.

The shaft 17, also actuated by the third element of the differential gear 30, sets the ball carrier 42 of the second part of the first-mentioned or duplex variable speed drive and consequently the second driven roller of this drive rotates in accordance with $$\frac{V_1 V_2}{Rp \cos Sp} = \frac{dV_2}{dt}$$

which is the acceleration of $V_2$ and this roller, by means of gearing, drives a shaft 43 which operates one element of a third differential gear 44 another element of which is driven by the handle 3, whilst, through a shaft 45, the third element operates the training generating device Z. Thus for a straight-course target the motion received from the shaft 43 renders movement of the handle 3 unnecessary, but for a curved-course target additional motion must be supplied from the handle 3 to cause the following pointer 15 driven by the training generating device Z to move at the same rate as the dial 12 driven by the training gear of the observing sight 14. Furthermore, a handle 46 mounted on the casing Y adjusts the ball carrier of a sixth variable speed drive 47, the driving element of which is also driven from the roller of the variable speed drive 35. The roller of the variable speed drive 47 rotates a dial 48 over which moves a pointer 49 rotated from the handle 3, with the result that, when the speed of the dial 48 is equal to the speed of the pointer 49, the rotation of the handle 46 is a measure of the difference in accelerations for $V_2$ multiplied by $$\frac{t}{2}$$

which constitutes a secondary vector giving the required correction to the vector $V_2$. By means of a shaft 50, the motion of the handle 46 operates one element of a fourth differential gear 51, another element of which is driven from the third element of the differential gear 44, whilst the third element of the differential gear 51 operates a shaft 52 which represents a composite vector and passes into the predictor X.

$$\frac{dV_3}{dt} = 0$$

for a straight-course target, the handle 5, after its initial adjustment, remains at rest unless the target takes a curved course, in which event the handle must be rotated in order that, acting through a shaft 53, it may cause the following pointer 16 driven by the elevation generating device Z to move at the same rate as the dial 13 driven by the elevating gear of the observing sight 14, the degree of rotation of the handle 5 being indicated by a pointer 54 driven thereby. A third handle 55, mounted on the casing Y, sets the ball carrier of a seventh variable speed drive 56, the driving element of which is driven from the roller of the variable speed drive 35. The roller of the variable speed drive 56 rotates a dial 57 associated with the pointer 54 and when the speed of this dial is equal to the speed of the pointer the rotation of the handle 55 is a measure of the difference in accelerations for $V_3$ multiplied by $$\frac{t}{2},$$

which constitutes a secondary vector giving the required correction to the vector $V_3$. By means of a shaft 58, the motion of the handle 55 is imparted to one element of a fifth differential gear 59, of which a second element is driven from the handle 5, whilst the third or result element drives a shaft 60 which represents a composite vector and passes into the predictor X.

It will be seen that the three shafts 41, 52 and 60 mentioned above as passing into the predictor are operated in accordance with the corrected vectors $V_1$, $V_2$ and $V_3$, the usual devices in this predictor serving to multiply the corrected vectors by the time of flight in order to produce the required data as above stated.

The invention is also applicable to the case wherein the principal vectors $V_1$, $V_2$, $V_3$ are related to the line of sight, the vector diagram in this case being as shown in Figure 4. The necessary modifications of the apparatus are depicted in Figure 5, from which it will be seen that the mechanisms for giving vector predictions for curved-course targets, namely, the handles 33, 46 and 55, shafts 39, 50 and 58, variable speed gears 34, 35, 47 and 56, pointers 32, 49 and 54 and, dials 38, 48 and 57, together with the shafts, etc. immediately associated with them, are similar to those above described. Corresponding to the quantities respectively representing accelerations for $V_1$ and $V_2$, namely $$\frac{V_2^2}{Rp \cos Sp}$$

and $$\frac{V_1 V_2}{Rp \cos Sp}$$

determined by the mechanism illustrated in Figure 3, it is necessary that the mechanism for determining rates of change of vectors in respect of a straight-course target according to Figure 5 should determine motions proportional to the quantities $$\frac{dV_1}{dt} = \frac{V_2^2 + V_3^2}{Rp}$$

and $$\frac{dV_2}{dt} = \frac{V_2(V_1 \cos Sp + V_3 \sin Sp)}{Rp \cos Sp}$$

In this case motion proportional to the rate of change of $V_3$, namely $$\frac{dV_3}{dt} = \frac{V_1 V_3 - V_2^2 \tan Sp}{Rp}$$

and the value of this quantity must be determined in addition, a further differential gear being provided for imparting the corresponding motion to the shaft of the $V_3$ handle 5.

For the purpose of determining the quantity $$\frac{dV_1}{dt}$$

in addition to the shafts 17 and 18, respectively rotated on actuation of the handles 1 and 3, there is a shaft 61 similarly associated with the handle 5. The shafts 18 and 61 respectively operate squaring mechanisms 62 and 63 driving result shafts 64 and 65 actuating two members of a differential gear 66, the result member of which sets the ball carrier of a variable speed drive 67. The disc of the latter is rotated by a shaft 68 having a motion proportional to the quantity $$\frac{1}{Rp}$$

with the result that the roller of the drive 67, to which is attached a shaft 69, is rotated proportionally to the quantity $$\frac{V_2^2 + V_3^2}{Rp}$$

The shaft 69 drives a member of the differential gear associated with the handle 1.

In order to determine the quantity $$\frac{dV_2}{dt}$$

a shaft 70 whose rotation is proportional to the factor $$\frac{V_2}{Rp \cos Sp}$$

serves to drive the disc of a variable speed gear 71, whereof the ball carrier is set by the result member of a differential gear 72 actuated from the shafts 17 and 61 respectively representing $V_1$ and $V_2$; by differential gears 73 and 74 the motions of these shafts are combined with that of the shaft 29 representing the angle $Sp$ and the combined motions are transmitted through cosine and sine mechanisms 75 and 76 respectively to the differential gear 72. Thus rotation of the shaft 77, attached to the roller of the variable speed drive 71 and rotating one element of the differential gear 44, is proportional to $$\frac{V_2(V_1 \cos Sp + V_3 \sin Sp)}{Rp \cos Sp}$$

As regards the quantity $$\frac{dV_3}{dt}$$

the shaft 29, representing $Sp$, drives a tangent mechanism 78 the motion of which, after combination with that of the shaft 64 representing $V_2^2$, is transmitted to one member of a differential gear 79, whereof another member is actuated from a multiplying mechanism 80 driven by the shafts 17 and 61 respectively representing $V_1$ and $V_3$. The result member of the differential gear 79 sets the ball carrier of a variable speed drive 81, whereof the disc is rotated from the shaft 68 representing $$\frac{1}{Rp}$$

so that the shaft 82 of the roller of the differential gear 81 rotates according to $$\frac{V_1 V_3 - V_2^2 \tan Sp}{Rp}$$

This shaft drives one member of a differential gear 83 of which another member is rotated by the $V_3$ handle 5 and the third member operates the differential gear 59 and the shaft 53 actuating the elevation generating device Z.

What I claim and desire to secure by Letters Patent of the United States is:—

1. In an anti-aircraft gun fire control apparatus for predicting a future position of a target wherein means movable for an assumed course are utilized to represent vectors in accordance with (1) the linear rate of approach or recession of the target in the direction of the plane of the line of sight, this vector being termed $V_1$, (2) the linear rate of movement of the target at right angles to the aforesaid direction, this vector being termed $V_2$, and (3) a linear height rate, this vector being termed $V_3$, comprising means for deriving range, training and elevation from the means representing said assumed course vectors, means for indicating observed range, training and elevation, means for deriving therefrom values of rates of change of target velocities in the directions of vectors $V_1$, $V_2$ and $V_3$, and adjustable means for adjusting said assumed course vector means until the range, training and elevation derived therefrom correspond to the observed range, training and elevation.

2. In an apparatus such as described in claim 1, means for deriving correctional movements for a change in the course of the target comprising means for deriving the difference between the values of the rates of change of target velocities in the directions of vectors $V_1$, $V_2$ and $V_3$ resulting from observed data and the values of the rates of change of the means representing the corresponding assumed course vectors and means for modifying the difference of these rates of change according to the time of flight of the target.

3. In an apparatus such as described in claim 1, having balance restoring means which are to be moved when a change of course of the target from the assumed course is noted, said balance restoring means being moved to restore the balance of comparison between the values of the rates of change of target velocities in the directions of vectors $V_1$, $V_2$ and $V_3$ resulting from observed data and the means representing the values of the rates of change of the assumed course vectors.

4. In a device such as described in claim 1, having balance restoring means which are to be moved when a change of course of the target from the assumed course is noted, said balance restoring means being moved to restore the balance of comparison between the values of the rates of change of target velocities in the directions of vectors $V_1$, $V_2$ and $V_3$ resulting from observed data and the means representing the values of the rates of change of the assumed course vectors, adjustable means for ascertaining the rates of change of said balance restoring means and means for modifying the movements of said adjustable means according to the time of flight.

5. In a device such as described in claim 1 having balance restoring means which are to be moved when a change in course of the target from the assumed course is noted, said balance restoring means being moved to restore the balance of comparison between the values of the rates of change of target velocities in the directions of vectors $V_1$, $V_2$ and $V_3$ resulting from observed data and the means representing the values of the rates of change of the assumed course vectors and differential means for combining the movements of the balance restoring means with the movements of the means representing the assumed course vectors.

6. In an apparatus such as described in claim 1, comprising means representing the vector for the linear height rate (V3) taken at right angles to the surface of the earth which remain stationary when the target remains on the assumed course, means for representing the generated range, means for representing the generated training and means for moving the means representing the other vectors continuously in accordance with the means representing the generated range and training.

7. In an apparatus such as described in claim 1, comprising means representing the vector for the linear height rate (V3) taken at right angles to the line of sight in a vertical plane through the observation point and target, means for representing the generated range, means for representing the generated training, and means for driving said means representing the linear height rate vector (V3) continuously in accordance with $$\frac{V_1 V_3 - V_2^2 \tan Sp}{Rp}$$

wherein $Sp$ represents present angle of sight and $Rp$ represents present range, and means for driving the means representing the other vectors continuously in accordance with the means representing the generated range and the means representing the generated training.

8. In an apparatus such as described in claim 1, comprising combination rotary shafts for representing the values of the rates of change of target velocities in the directions of vectors $V_1$, $V_2$, and $V_3$, devices for giving indications resulting from the rotation of said shafts, complementary indicating devices in comparable association with said first mentioned indicating devices, a variable speed drive, a constant source of power for rotating said variable speed drive, means for controlling said drive in accordance with a function of the time of flight, additional variable speed drives each rotatable by the result member of said first mentioned variable speed drive, and additional series of shafts, means for controlling said second mentioned variable speed drives respectively in accordance with the movements of the shafts in said additional series, means for transmitting the movements of the result members of the said second mentioned variable speed drives respectively to said complementary indicating devices, elements moved from external sources to represent various basic quantities, means for combining the movements of said elements to determine acceleration for at least two of the values of rates of change of target velocities in the directions of vectors $V_1$, $V_2$ and $V_3$, means for transmitting motion from said combining means to said members, members representing by their motions said secondary vectors, differential gear means for combining the motions of said members representing accelerations with those of said shafts representing values of rates of change of target velocities in the directions of vectors $V_1$, $V_2$ and $V_3$, a predictor, elements for actuating said predictor and differential gear means for superimposing said last mentioned combined motions on those of said secondary vector members and for applying said superimposed motions to said predictor-actuating elements.

JOHN PERCIVAL WATSON.